United States Patent

[11] 3,621,222

| [72] | Inventor | Shigeo Minami<br>Ashiya-shi, Japan |
|---|---|---|
| [21] | Appl. No. | 799,428 |
| [22] | Filed | Feb. 14, 1969 |
| [45] | Patented | Nov. 16, 1971 |
| [73] | Assignee | Hatachi, Ltd.<br>Tokyo, Japan |

[54] DATA PROCESSING SYSTEM FOR CURVES RECORDING ON CHARTS WHOSE TRACE VARIES IN WIDTH
9 Claims, 10 Drawing Figs.

[52] U.S. Cl............................................. 235/181,
73/105, 235/61.6 C, 235/183, 235/150.53,
250/202, 250/209, 307/260
[51] Int. Cl...................................................... G06g 7/19,
G06f 15/34
[50] Field of Search........................................... 235/181,
183, 61.6 C; 73/105, 35; 250/202, 217 CR, 208,
209, 217

[56] References Cited
UNITED STATES PATENTS

| 2,756,928 | 7/1956 | Hudson et al................ | 235/183 |
|---|---|---|---|
| 2,892,948 | 6/1959 | Frantz........................ | 250/202 |
| 2,915,242 | 12/1959 | Georges-Doll............... | 235/61.6 |
| 2,931,566 | 4/1960 | Strassner..................... | 235/61.6 |
| 3,123,999 | 3/1964 | Tudd........................... | 73/105 |
| 3,168,643 | 2/1965 | Robinson..................... | 235/61.6 |

Primary Examiner—Eugene G. Botz
Assistant Examiner—Felix D. Gruber
Attorney—Craig, Antonelli & Hill ABSTRACT: A data processing system for curves recorded on charts wherein a straight line $y=a$ (constant) and a curve $y=f_1(x)$ are recorded, the curves having a certain width.

Variations in reflected light are detected by photoelectric transducer elements and converted into electrical signals.

A sequence of rectangular waves having widths equal to intervals between an electric signal corresponding to the position of the line $y=a$ and electric signals corresponding to the position of the curve $y=f_1(x)$ are obtained from the photoelectric transducer elements by rotating the chart in a y-direction and by scanning with an optical head, including a light source and photoelectric transducer elements, in an x-direction; the sequence of rectangular waves are applied to a summing integrator and its output to a display device, whereby a new curve proportional to the average position of both edges of the curve $y=f_1(x)$ is obtained; when weighting the rectangular waves according to a function $y=f_2(x)$, a new curve is obtained which corresponds to the convolution of the functions $f_1(x)$, $f_2(x)$.

INVENTOR
SHIGEO MINAMI

BY Craig, Antonelli, Stewart & Hill

ATTORNEYS

PATENTED NOV 16 1971 3,621,222

INVENTOR
SHIGEO MINAMI

BY Craig, Antonelli, Stewart & Hill
ATTORNEYS

DATA PROCESSING SYSTEM FOR CURVES RECORDING ON CHARTS WHOSE TRACE VARIES IN WIDTH

The present invention relates to a data processing system for curves recorded on charts the trace of which varies in width, and more particularly to a data processing system for photoelectrically reading a curve having a certain width recorded on a chart and obtaining a new curve corresponding to the average position of both edges of the recorded curve.

There are various kinds of data processing systems for photoelectrically reading a curve recorded on a chart of a recorder and obtaining an electrical signal corresponding to the position of the record. These systems, however, have the disadvantage that when the recorded curve has a certain width due to noise or the like, the converted electrical signal is not of the value proportional to the average position of the edges of the recorded curve, but has some error.

Therefore, it is an object of the present invention to provide a novel data processing system capable of photoelectrically reading a curve having a certain width due to noise or the like recorded on a chart and obtaining a new curve representing the average position of both edges of the recorded curve.

Another object of the present invention is to provide a novel data processing system capable of photoelectrically reading a curve having a certain width due to noise or the like recorded on a chart and obtaining a new curve which is proportional to the average position of both edges of the recorded curve and which is a moving average of the recorded curve.

A further object of the present invention is to provide a novel data processing system capable of obtaining a new curve which is an average of a curve $y=f_1(x)$ in $y$- and $x$-directions by calculating the convolution of the function $y=f_1(x)$ and another function $y=f_2(x)$.

According to the present invention there is provided a data processing system comprising a chart on which a curve representing a function $y=g(x)$ and a curve representing a function $y=f_1(x)$ and having a certain width are recorded, an optical head including means for directing a beam of light to said chart and means for converting a beam of light obtained from said chart into electric signals, first means for moving said optical head and said chart in a $y$-direction, second means for moving the other of said optical head and said chart in an $x$-direction, means for generating rectangular waves having widths proportional to intervals between electric signals corresponding to the position of said curve representing $y=g(x)$ and the positions of the edges of said curve representing $y=f_1(x)$, said electric signal being obtained by said converting means, means for summing said rectangular waves as one of analog and digital quantities in relation to both said first and second moving means, and means for deriving an output from said summing means.

The present invention will become more apparent from the following detailed description of the invention when read with reference to the accompanying drawings, in which.

Figure 1:
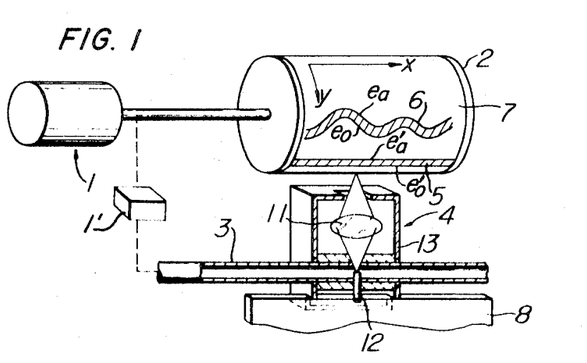
FIG. 1 is a partly sectional perspective view of an embodiment of the mechanical part of the data processing system according to the invention.
Figure 2:
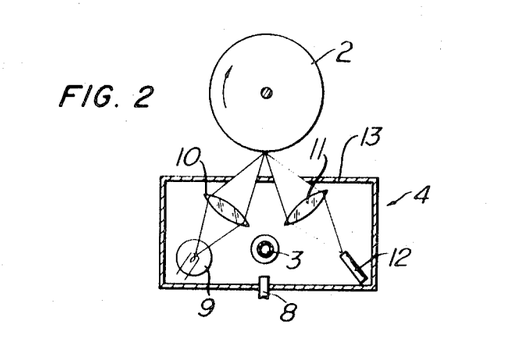
FIG. 2 is a partly sectional side view of the embodiment of FIG. 1.

Referring to FIGS. 1 and 2, the mechanical part of the data processing system according to the present invention comprises driving means 1, such as a motor, having a shaft rotating at a constant speed, a rotary drum 2 directly connected with the shaft of the driving means 1, a rotatable feed screw 3 which is driven by the driving means 1 through a gearing 1', an optical head 4 driven by the feed screw 3 in an axial direction thereof while guided by a fixed guide plate 8, and a chart 7 wound on the rotary drum 2. On the chart 7 there are recorded a curve 6 representing the function $y=f_1(x)$ and having a certain width and a curve 5 representing the function $Y=g(x)$. In FIG. 1, the curve 5 is a straight line $y=a$, where a constant. The curve 5 may have no width, but it is represented in FIG. 1 as having a width. The optical head 4 comprises a casing 13 including therein a light source 9, a lens 10 for condensing light rays from the light source 9 on the chart 7, a lens 11 for condensing reflected light rays from the chart 7, and a photoelectric transducer element 12 for detecting the light beam condensed by the lens 11 and for converting it into an electric signal having a magnitude proportional to the intensity of the light beam.

Figure 3:
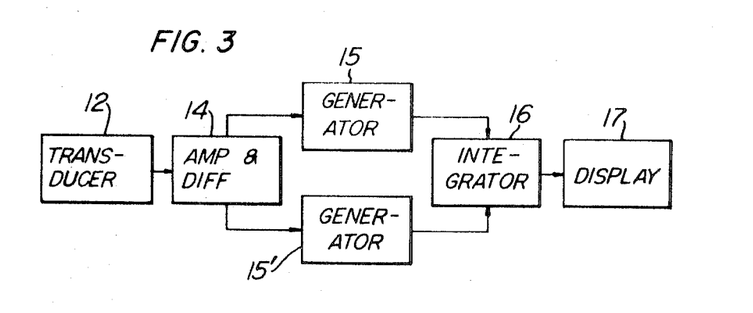
FIG. 3 is a block diagram of an embodiment of the circuit of the data processing system according to the invention.
Figure 7A:
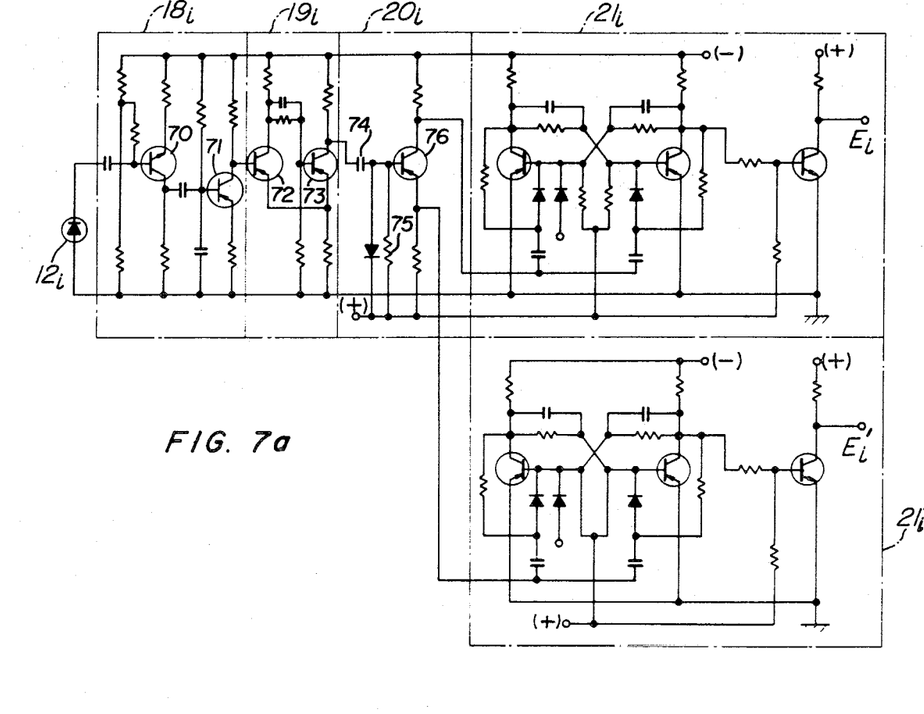
FIGS. 7a and 7b are circuit diagrams of an embodiment, corresponding to those of FIGS. 3 and 5, used with the embodiment of FIG. 6.

FIG. 3 shows the electrical circuit of a data processing system according to the present invention comprising an amplifying and differentiating circuit 14 connected to the photoelectric transducer element 12, a pair of rectangular wave-generating circuits 15 and 15', each comprising a binary counter connected flip-flop, which reverses its binary state each time an input pulse is applied thereto, as shown at $21_i$ or $21_i'$ in FIG. 7a, connected to the amplifying and differentiating circuit 14, an analog-summing integrator 16, and display means 17 connected to the analog-summing integrator 16. The analog-summing integrator 16 is one which is ordinarily employed in an analog computer as shown at 22 in FIG. 7b. As is well known, the integrator 16 is an arithmetic unit which produces as an output signal a time integral of the sum of a plurality of input signals multiplied by respective constants.

Figure 4:
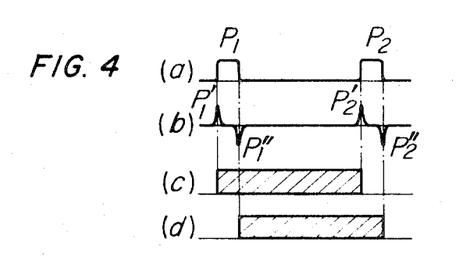
FIG. 4 shows output waveforms of some component units of the embodiment of FIG. 3.

With the above-mentioned construction, the rotary drum 2 is rotated at a constant speed, together with the chart 7 wound thereon, in a $y$-direction by the driving means 1. The feed screw 3 is rotated by the driving means 1 through the gearing 1' to drive the optical head in an $x$-direction. While the rotary drum 2 completes one rotation for a first position of the optical head 4, electric signals as shown at ($a$) in FIG. 4 are obtained from the photoelectric transducer element 12. In FIG. 4 ($a$), $P_1$ is the waveform an electric signal corresponding to the straight line 5 representing the function $y=a$ and having a certain width, and $P_2$ is the waveform an electric signal corresponding to the curve 6 representing the function $y=f_1(x)$ and having a certain width. The electric signals obtained from the photoelectric transducer element 12 are supplied to the circuit 14 so as to be amplified and differentiated. An output from the amplifying and differentiating circuit 14 is as shown in FIG. 4 ($b$) wherein electric pulses $P_1'$ and $P_1''$ correspond to the edges $e_o'$ and $e_a'$ of the straight line 5 (FIG. 1), respectively, and electric pulses $P_2'$ and $P_2''$ correspond to the edges $e_o$ and $e_a$ of the curve 6 (FIG. 1), respectively. When these electric pulses are supplied to the rectangular wave-generating circuits 15 and 15', rectangular waves as shown at ($c$) and ($d$) in FIG. 4 are generated thereby. More specifically, the signals $P_1'$ $P_2'$ are applied to the flip-flop circuit 15 as triggering inputs to invert the binary state of the flip-flop 15. As a result, a rectangular wave as shown at ($c$) in FIG. 4 is produced. Similarly, the signals $P_1$ and $P_2$ are applied to the flip-flop circuit 15' as triggering inputs to invert the binary state of the flip-flop circuit 15'. As a result, a rectangular wave as shown at ($d$) in FIG. 4 is produced. These rectangular waves have a duration or width equal to intervals between $P_1'$ and $P_2'$ and between $P_1''$ and $P_2''$, respectively. These rectangular waves are summed at the analog-summing integrator 16, to produce a signal having an amplitude proportional to the interval between the average position of the edges $e_o$ and $e_a$ of the curve 6 and the average position of the edges $e_o'$ and $e_a'$ of the straight line 5 which signal is supplied to the display means 17. Consequently, since the optical head 4 is moved one pitch in the $x$-direction for each rotation of the rotary drum 2 in the y-direction, the curve depicted on the display means 17 is one which is proportional to the average position of both edges $e_o$ and $e_n$ of the curve 6 (FIG. 1).

Figure 5:
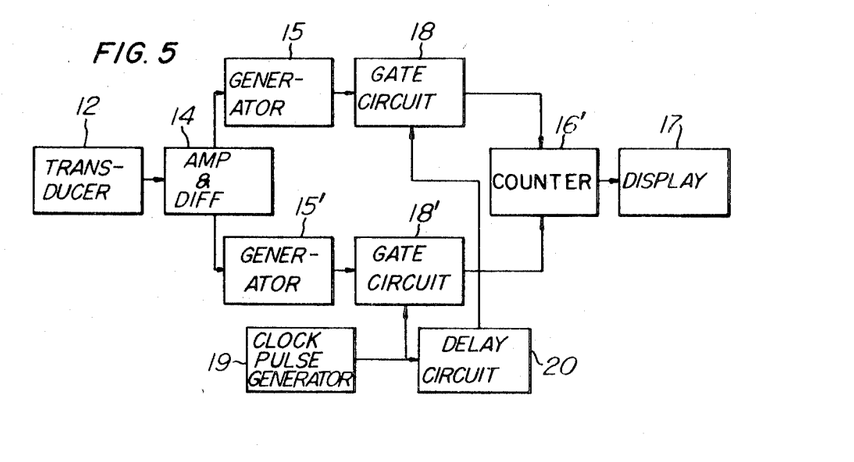
FIG. 5 is a block diagram of another embodiment of the circuit of the data processing system according to the invention.

FIG. 5 shows a modification of the circuit of FIG. 3. Similar parts are designated by similar reference numerals. The circuit of FIG. 5 is different from that of FIG. 3 in that the circuit of FIG. 3 is directed to analog addition, the circuit of FIG. 5 is directed to digital addition. For this reason the circuit of FIG. 5 further comprises gate circuits 18 and 18', a clock pulse generating circuit 19, a delay circuit 20, and a digital summing circuit 16' such as a binary counter.

From the rectangular wave-generating circuits 15 and 15' rectangular waves as shown in FIGS. 4 (c) and (d) are generated as in the circuit of FIG. 3. The gate circuit 18' is connected to the clock pulse generating circuit 19, and the gate circuit 18 is connected to the delay circuit 20 which in turn is connected to the clock pulse generating circuit 19. When rectangular waves as shown in FIGS. 4 (c) and (d) are supplied to the gate circuits 18 and 18', these gate circuits generate pulses of the numbers corresponding to the widths of the rectangular waves, respectively. These pulses are added at the digital-summing circuit 16' which produces, at its output, clock pulses the number of which is proportional to the interval between the average position of the edges $e_o$ and $e_n$ of the curve 6 and the average position of the edges $e_o'$ and $e_n'$ of the straight line 5 and which clock pulses are supplied to the display means 17. It is evident that also in the circuit of FIG. 5, a curve proportional to the average position of both edges $e_o$ and $e_n$ of the curve 6 in FIG. 1 is displayed on the display means 17.

Figure 6:
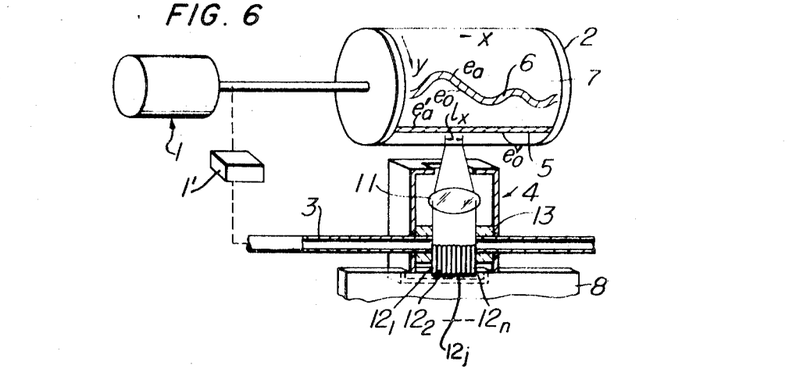
FIG. 6 is a partly sectional perspective view of another embodiment of the mechanical part of the data processing system according to the invention.

The arrangement of FIG. 6 is a modification of the arrangement of FIG. 1. Similar parts are designated by similar reference numerals. The arrangement of FIG. 6 is different from the arrangement of FIG. 1 in that a light beam to be projected on the chart 7 has a certain width $\iota_x$ in the x-direction there are provided a plurality of photoelectric transducer elements $12_1, 12_2, ..., 12_i, ..., 12_n$ at equal intervals, and an image corresponding to the width $\iota_x$ on the chart 7 is projected by the lens 11 on the photoelectric transducer elements $12_1, 12_2, ..., 12_i, ..., 12_n$, where the suffixes $1, 2, ..., i, ..., n$ indicate the channel numbers.

Figure 7B:
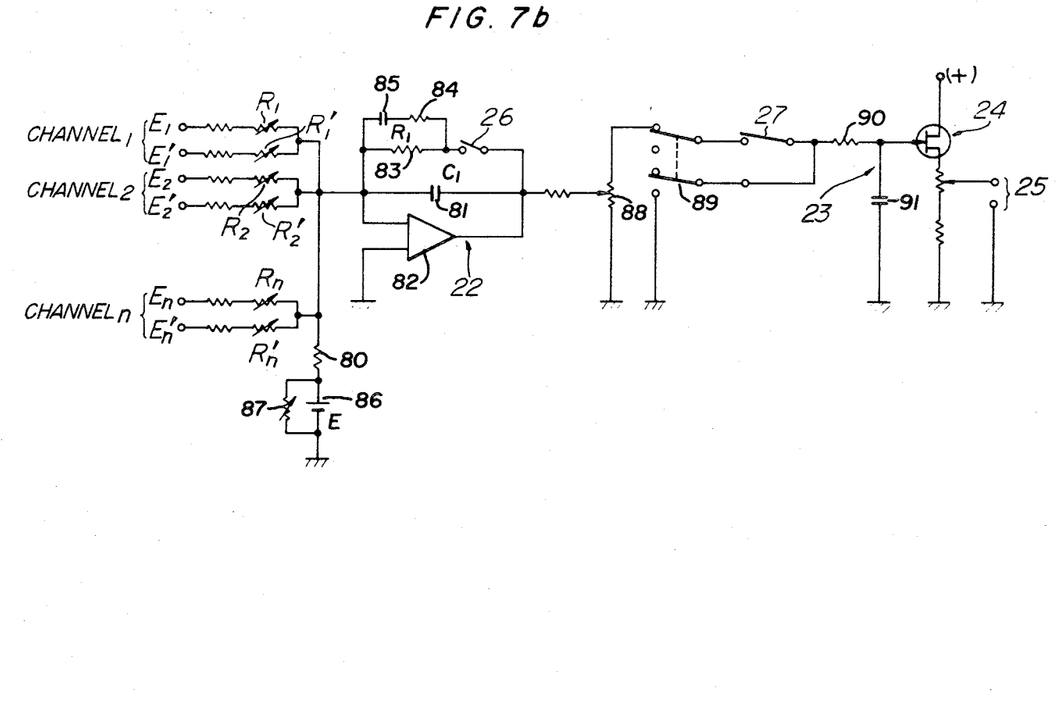

FIGS. 7a and 7b show electric circuits used with the arrangement of FIG. 6. FIG. 7a shows the electric circuit of the $i$-th($1 \leq i \leq n$) photoelectric transducer element among the plurality of photoelectric transducer elements $12_1, 12_2, ..., 12_i, ..., 12_n$.

The photoelectric transducer element $12_i$ detects the light reflected by the part corresponding to the position of the element $12_i$ among the images corresponding to the width $x$ on the chart 7 directed by the lens 11 to the photoelectric transducer elements $12_1, 12_2, ..., 12_i, ..., 12_n$ to convert it into an electric signal.

Consequently, the interval between the electric signals shown at (a) in FIG. 4 which are outputs from each of the photoelectric transducer elements $12_1, 12_2, ..., 12_i, ..., 12_n$ produced at each revolution of the drum 2 is different depending on the position of each photoelectric transducer element. Thus, of the outputs from the transducer elements produced at each revolution of the drum 2 of the electric signals $P_1$ corresponding to the straight line 5 are produced at the same position on the same time axis, but the electric signals $P_2$ corresponding to the curve 6 are produced at different positions on the same time axis depending on the transducer elements.

The output from the photoelectric transducer element $12_i$ is amplified by an amplifying circuit $18_i$ comprising transistors 70 and 71 and then shaped by the shaping circuit $19_i$ consisting of a Schmitt circuit which comprises transistors 72 and 73. The shaped electric signal is supplied to a CR differentiating circuit comprising a capacitor 74 and a resistor 75 and a trigger pulse generating circuit $20_i$ comprising a transistor 76 to produce at each revolution of the drum 2 trigger pulses $P_1'$, $P_1''$ and $P_2'$, $P_2''$ as shown at (b) in FIG. 4. The circuits $18_i$, $19_i$ and $20_i$ correspond to the amplifying and differentiating circuit 14 in FIG. 3.

The circuit of FIG. 7a further comprises a first rectangular wave generating and amplifying circuit $21_i$ and a second rectangular wave generating and amplifying circuit $21_i'$ each of which employs a binary counter connected flip-flop circuit which reverses its binary state each time a trigger pulse is applied thereto.

The outputs $E_i$ and $E_i'$ of the circuits $21_i$ and $21_i'$ which correspond to the rectangular wave-generating circuits 15 and 15' in FIG. 3, respectively, provide waves (c) and (d) shown in FIG. 4.

As described above, the photoelectric transducer element $12_i$ may be any one of the photoelectric transducer elements $12_1, 12_2, ..., 12_i, ..., 12_n$ shown in FIG. 6, so that the entire system includes the circuits shown in FIG. 7a the number of which is equal to the number of the channels, i.e., the number of the photoelectric elements.

FIG. 7b shows a function-setting resistor network, a summing integrator and a holding circuit. This arrangement has no particular relationship with the arrangement of FIG. 3 except that the structure of the integrator in FIG. 3 corresponds to the summing integrator described later.

The circuit of FIG. 7b includes input terminals $E_1$ and $E_1'$; $E_2$ and $E_2'$; ...; $E_i$ and $E_i'$; ...; $E_n$ and $E_n'$ for respective channels and function setting resistor networks $R_1$ and $R_1'$; $R_2$ and $R_2'$; ...; $R_i$ and $R_i'$; ...; $R_n$ and $R_n'$ connected to the respective input terminals which set values approximately by certain segmented line functions as described later and weight rectangular waves appearing at the input terminals $E_1$ and $E_1'$; $E_2$ and $E_2'$; ...; $E_i$ and $E_i'$; ...; $E_n$ and $E_n'$ with the above values of function. These signals weighed with the values set by the function-setting resistor networks are sum-integrated by a summing integrator 22 comprising a resistor 80, a capacitor 81 and an operational amplifier 82. The summing integrator 22 is one commonly employed in an analog computer as is well known, and its operation is to generate an integrated value with respect to time of the sum of a plurality of outputs from the function-setting resistor networks multiplied by respective constant. A normally open switch 26 for discharging the capacitor 81 momentarily closes to discharge the capacitor 81 at each revolution of the drum 2 when a switch 27 for supplying a signal to a holding circuit 23 described later is in an open state. The capacitor 81 is for integration, and the resistor 80 is for current limitation, the time constant $C_1R_1$ thereof being made large within the range within which the operation of the summing integrator 22 is not impaired. A resistor 84 and a capacitor 85 are for spark quenching at the time of opening and closing of the switch 26.

A voltage source 86 and a variable resistor 87 connected between the function setting resistor networks $R_1$ and $R_1'$; $R_2$ and $R_2'$; ...; $R_i$ and $R_i'$; ...; $R_n$ and $R_n'$ and the ground are for offset voltage suppression.

A variable resistor 88 connected to the output of the summing integrator 22 is for adjustment of the output from the summing integrator 22, and a double pole switch 89 is for grounding the input of the later described holding circuit 23 when the latter is zero-point adjusted. In the normal state, the position of the switch 89 is as shown in FIG. 7b. A normally open switch 27 momentarily closes at each revolution of the drum 2 to supply the output of the summing integrator 22 to the holding circuit 23. When the time integral of the input signal to the summing integrator 22 reaches a predetermined value, the switch 27 momentarily closes and opens in the state shown in FIG. 7b to supply the output of the summing adder 22 to the holding circuit 23 and then the switch 26 momentarily closes and opens to discharge the capacitor 81.

The holding circuit 23 comprising a resistor 90 and a capacitor 91 holds the pulse output of the summing integrator 22 generated by the rotation of the drum 2 applied thereto by the momentary closure of the switch 27 during the open state of the switch 27, and when the pulse output of the summing integrator 22 generated by the next rotation of the drum 2 is supplied thereto by the closure of the switch 27, the holding circuit 23 repeats charge and discharge operation following the amount of the pulse supplied thereto.

A field effect transistor 24 connected to the holding circuit 23 is an impedance conversion transistor for matching the holding circuit 23 with the input impedance of a recorder. The output terminals 25 of the transistor 24 are connected to a filter and recorder (not shown).

The output terminal $E_i$ of the first rectangular wave generating and amplifying circuit $21_i$ and the output terminal $E_i'$ of the second rectangular wave generating and amplifying circuit $21_i'$, in FIG. 7a, are the input terminals $E_i$ and $E_i'$, respectively, in FIG. 7b.

Now, if the rotary drum 2 in FIG. 6 completes one rotation in the y-direction in a rest state of the optical head 4, electric signals corresponding to the positions of the edges $e_o'$ and $e_n'$ of the curve 5 representing the function $y=g(x)$ and electric signals corresponding to the positions of the edges $e_o$ and $e_n$ of the curve 6 representing the function $y=f_1(x)$ are obtained from each of the photoelectric transducer elements $12_1$, $12_2$,...$12_i$...$12_n$. The electric signals, corresponding to the positions of the edges $e_o'$ and $e_n'$ of the curve 5 representing the function $y=g(x)$ and edges $e_o$ and $e_n$ of the curve 6 representing the function $y=f_1(x)$, obtained from the photoelectric transducer element $12_i$ of the $i$-th channel are amplified by the amplifying circuit $18_i$ in FIG. 7a and shaped by the shaping circuit $19_i$. From the shaped signals the trigger pulse-generating circuit $20_i$ generates trigger pulses which trigger the first and second rectangular wave generating and amplifying circuits $21_i$ and $21_i'$. Then, a first rectangular wave having a width equal to the interval between the electric signal corresponding to the position of one edge $e_o'$ of the curve $y=g(x)$ and the electric signal corresponding to the position of one edge $e_o$ of the curve $y=f_1(x)$ and a second rectangular wave having a width equal to the interval between the electric signal corresponding to the position of the other edge $e_n'$ of the curve $y=g(x)$ and the electric signal corresponding to the position of the other edge $e_n$ of the curve $y=f_1(x)$ appear at the terminals $E_i$ and $E_i'$, respectively. Assuming that these rectangular waves, which are of equal amplitude, are labeled $S_i$ and $S_i'$, all the rectangular waves $S_1, S_1'; S_2, S_2';...S_i, S_i';...; S_n, S_n'$ are supplied to the function-setting resistor networks $R_1, R_1'; R_2, R_2'... R_i, R_i';...R_n, R_n'$ to be weighed with the values set thereby respectively.

The resulting rectangular waves having amplitudes according to weighed with these values are supplied to the summing integrator 22 in FIG. 7b to be summed and integrated. That is, the sum of the outputs of the function-setting resistor networks $R_1, R_1'; R_2, R_2'...R_i, R_i';...R_n, R_n'$ appears across the resistor 80 and is integrated with respect to time by the integrator comprising the capacitor 81 and the operational amplifier 82.

Figure 8:
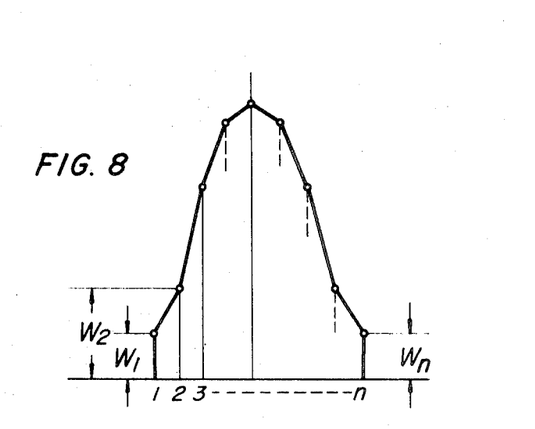
FIG. 8 is a function to be set at the function setting part in the circuit of FIG. 7b.
Figure 9:
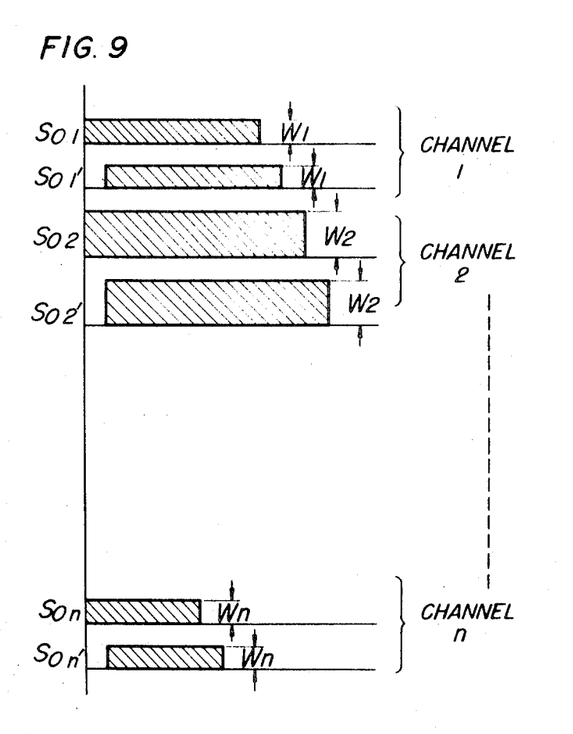
FIG. 9 shows outputs from the function setting part in the circuit of FIG. 7b.

If the weighting function is of the form a segmented line as shown in FIG. 8, output signals from the function-setting resistors $R_1, R_1'; R_2, R_2';...; R_n, R_n'$ are rectangular waves $S_{01}$, $S_{01}'$ having a height or amplitude $w_1$; rectangular waves $S_{02}$, $S_{02}'$ having a height $w_2$;...; rectangular waves $S_{on}$, $S_{on}'$ having a height $w_n$, respectively, as shown in FIG. 9. The rectangular waves of the respective channels 1, 2,..., n in FIG. 9 have widths equal to intervals between electric signals corresponding to the edges $e_o'$ and $e_n'$ of the curve $y=g(x)$ and electric signals corresponding to the edges $e_o$ and $e_n$ of the curve $y=f_1(x)$ in FIG. 6. These rectangular waves are integrated at the summing integrator 22. If the weight function is $f_2(x)$, the following convolution between the functions $f_1(x)$ and $f_2(x)$ is calculated in the summing integration 22:

$$\phi(x) = \int_{\infty}^{\infty} f_1(x_0) f_2(x-x_0) dx_0 = \int_a^b f_1(x_0) f_2(x-x_0) dx_0$$

where $a$ and $b$ are values relating to a projected length of the width of the photoelectric transducer elements $12_1,..., 12_n$ on the chart 7 in FIG. 6.

The signal obtained by summation in the summing integrator 22 is held in the holding circuit 23 by closing the switch 27, and supplied through the field effect transistor 24 to the output terminals 25 which are also the input terminals to the not shown filter and recorder. The discharge of the summing integrator 26 is effected by closing the switch 26. Thus, if the optical head 4 in FIG. 6 moves one pitch in the x-direction for each one rotation of the rotary drum 2, a new curve which is proportional to the average position of both edges $e_o$ and $e_n$ of the curve $y=f_1(x)$ and which is a weighted moving average of the function $y=f_1(x)$ is recorded on the recorder. Actually the switches 26 and 27 are designed to be opened and closed once for every rotation of the rotary drum 2.

Instead of the function-setting resistors $R_1, R_1'; R_2, R_2';...; R_n, R_n'$ for obtaining a weight function, any other function-setting circuit capable of obtaining any function can be employed, or this circuit may be eliminated if such is not necessary. In any case it is evident that a curve which is proportional to the average position of both edges $e_o$ and $e_n$ of the curve $y=f_1(x)$ and which is a simple moving average (shown in FIG. 1) or a weighted moving average (shown in FIG. 6) of the function $y=f_1(x)$ can be obtained.

It is to be noted that since many modifications and alterations of the system of the invention can be made by those skilled in the art, the above description of the invention is only for a better understanding of the invention and does not intend to limit the invention.

What is claimed is:

1. A data processing system for curves reported on charts, the trace of said curves varying in width, comprising:

a chart on which a curve representing a first function $y=g(x)$ and a curve representing a second function $y=f_1(x)$ having a certain width are recorded, where $x$ and $y$ are the respective axes of said chart;

an optical head, including means for directing a beam of light, said beam having a certain width in an x-direction to said chart and means for converting beams of light obtained from said chart into electric signals, said converting means comprising a plurality of photoelectric transducer elements, each detecting light reflected from the portion of said chart corresponding to its position among said transducer elements, so as to generate electric signals corresponding to the positions of said curves $y=g(x)$ and $y=f_1(AHx)$, respectively;

means for moving said chart at a constant speed in a y-direction;

means for moving said optical heat at a constant speed in an x-direction;

means for differentiating each of the outputs of said plurality of photoelectric transducer elements, said differentiating means comprising a plurality of differentiating circuits each producing a pulse corresponding to the positions of said curve $y=g(x)$ and pulses corresponding to the positions of the edges of said curve $y=f_1(x)$;

means, responsive to the outputs of said differentiating circuits, for generating rectangular waves, said rectangular wave-generating means comprising a plurality of rectangular wave-generating circuits, each circuit producing rectangular waves having widths proportional to the time intervals between the electric signal corresponding to the position of the curve $y=g(x)$ and the signals corresponding to the positions of the edges of said curve $y=f_1(x)$;

means, for imparting a weighting function $y=f_2(x)$, for the calculation of a convolution, to the rectangular waves generated by said rectangular wave-generating circuits, said weighting function imparting means comprising a resistor network consisting of a plurality of resistors, the values of which are set at discrete values of the weighting function $y=f_2(x)$, said set values weighting said rectangular waves;

2. A data processing system according to claim 1, wherein said function $y=g(x)$ is defined by the equation $y=a$ where $a$ is a constant.

3. A data processing system according to claim 1, wherein said curve representing said function $y=g(x)$ has a certain width, said differentiating circuits produce pulses corresponding to the positions of the edges of said curve $y=g(x)$ and pulses corresponding to the positions of the edges of said curve $y=f_1(AHx)$, and said rectangular wave-generating circuits are adapted to generate rectangular waves having widths proportional to time intervals between electric signals corresponding to the position of one edge of said curve $y=g(x)$ and the position of one edge of said curve $y=f_1(x)$ and between the position of the other edge of said curve $y=g(x)$ and the position of the other edge of said curve $y=f_1(x)$ for each of said photoelectric transducer elements.

4. A data processing system for curves recorded on a chart, the trace of said curves varying in width, comprising:

a chart on which a curve representing a function $y=g(x)$ and a curve $y=f_1(x)$ having a certain width are recorded, where $y$ and $x$ are the respective coordinates of said chart;

a rotary drum on which said chart is wound;

an optical head including means for directing a beam of light having a certain width in an $x$-direction to said chart and means for converting beams of light obtained from said chart into electric signals, said converting means comprising a plurality of photoelectric transducer elements each detecting light reflected from the portion of said chart corresponding to its position among said transducer elements to generate electric signals corresponding to the positions of said curves $y=g(x)$ and $y=f_1(x)$, respectively;

means for rotating said rotary drum at a constant speed in a $y$-direction;

means for moving said optical head at a constant speed in an $x$-direction;

means, responsive to the outputs of said photoelectric transducer elements, for shaping the electric signals produced thereby;

means, responsive to the outputs of said shaping circuits, for differentiating each of the output signals therefrom, said differentiating means comprising a plurality of differentiating circuits, each producing a pulse corresponding to the position of said curve $y=g(x)$ and pulses corresponding to the positions of the edges of said curve $y=f_1(x)$;

means, responsive to the pulse outputs of said differentiating circuits, for generating rectangular waves, said rectangular wave-generating means comprising a plurality of rectangular wave-generating circuits, each circuit producing rectangular waves having widths proportional to the time intervals between the electric signal corresponding to the position of the curve $y=g(x)$ and the signals corresponding to the positions of the edges of the curve $y=f_1(x)$;

means for imparting a weighting function $y=f_2(x)$, for the calculation of a convolution, to the rectangular waves generated by said rectangular wave-generating circuit, said weighting function imparting means comprising a resistor network consisting of a plurality of resistors, the values of which are set at discrete values of the weighting function $y=f_2(x)$, said set values weighting said rectangular waves;

a summing integrator for summing and integrating said weighted rectangular waves, said summing integrator producing an output proportional to the weighted moving average of the time interval between the position of said curve $y=g(x)$ and the position of said curve $y=f_1(x)$; and means for deriving said output from said summing integrator.

5. A data processing system according to claim 4, wherein said function $y=g(x)$ is defined by $y=a$, where $a$ is a constant.

6. A data processing system according to claim 4, wherein said curve representing the function $y=g(x)$ has a certain width, said differentiating circuits produce pulses corresponding to the positions of the edges of said curve $y=g(x)$ and pulses corresponding to the positions of the edges of said curve $y=f_1(x)$, and said rectangular wave-generating circuits are adapted to generate rectangular waves having widths proportional to time intervals between the electric signals corresponding to the position of one edge of said curve $y=g(x)$ and the position of one edge of the curve $y=f_1(x)$ and between the position of the other edge of said curve $y=g(x)$ and the position of the other edge of said curve $y=f_1(x)$ for each of said photoelectric transducer elements.

7. A data processing system according to claim 6, wherein said means for deriving an output from said summing integrator includes a holding circuit, switchably connected to said summing integrator and an impedance matching circuit connected to the output of said holding circuit.

8. A data processing system according to claim 7, wherein said holding circuit comprises a capacitor, having one terminal thereof connected to a switch, connected in series with the output of said summing integrator.

9. A data processing system according to claim 8, wherein said impedance matching circuit includes a field effect transistor connected in parallel with said holding circuit capacitor and a variable resistor connected to one electrode of said field effect transistor, to which the system output terminal is connected.

* * * * *

UNITED STATES PATENT OFFICE
CERTIFICATE OF CORRECTION

Patent No. 3,621,222　　　　　　　　　　　Dated November 16, 1971

Inventor(s) Shigeo MINAMI

It is certified that error appears in the above-identified patent and that said Letters Patent are hereby corrected as shown below:

Page 1, column 1, line 6,

"Hatachi" should read --Hitachi--

Signed and sealed this 13th day of June 1972.

(SEAL)
Attest:

EDWARD M. FLETCHER, JR.　　　　　　　ROBERT GOTTSCHALK
Attesting Officer　　　　　　　　　　Commissioner of Patents